Figure 1:
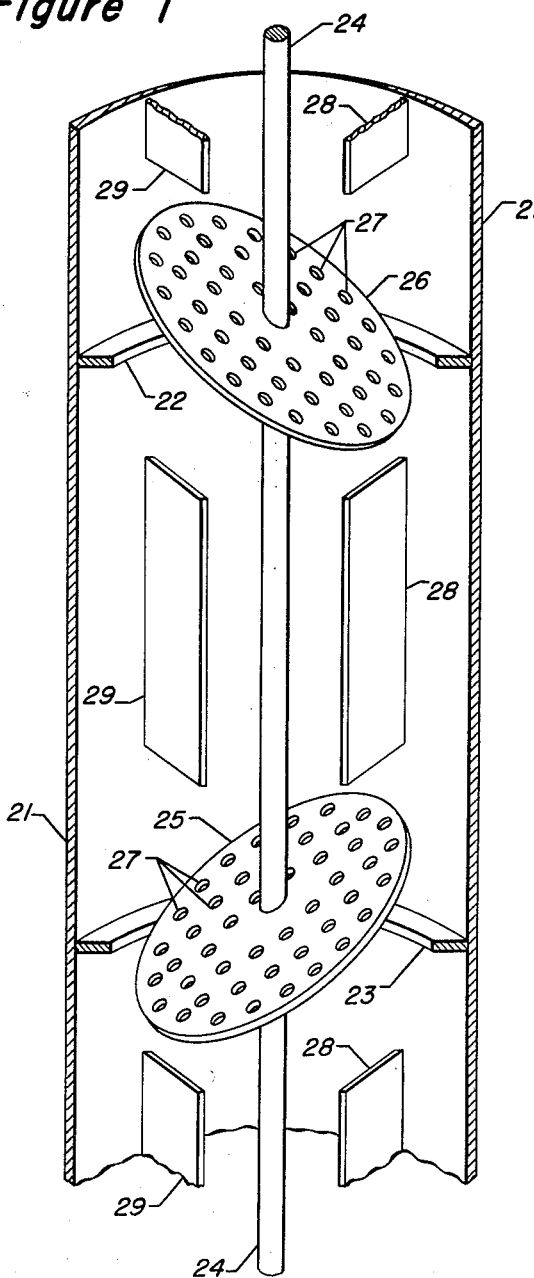
Figure 2:
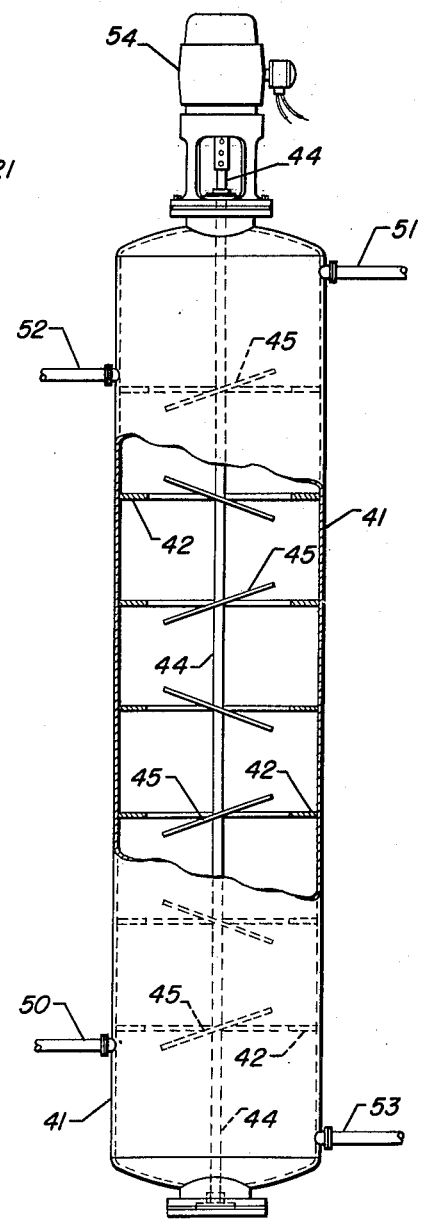

Nov. 24, 1959  L. G. MASSEY ET AL  2,914,385
CONTACTING APPARATUS
Filed Sept. 2, 1955

INVENTORS:
Lester G. Massey
William K.T. Gleim
By: Chester J. Giuliani
ATTORNEY:
Glen R. Grunewald
AGENT:

United States Patent Office 2,914,385
Patented Nov. 24, 1959

2,914,385
CONTACTING APPARATUS

Lester G. Massey, Arlington Heights, and William K. T. Gleim, Island Lake, Ill.; said Massey assignor, by mesne assignments, to Universal Oil Products Company, Des Plaines, Ill., a corporation of Delaware Application September 2, 1955, Serial No. 532,183

2 Claims. (Cl. 23—270.5)

This invention relates to a contacting process and apparatus and particularly to a special apparatus for producing stagewise countercurrent contact between two substantially immiscible liquid streams.

In many processes, such as scrubbing or extraction, it is desirable to countercurrently contact a liquid with another substantially immiscible liquid to dissolve or otherwise remove a component from one stream and introduce it into the other. This is accomplished by introducing both liquids as separate phases into a contacting zone with one liquid as a continuous phase and the second in subdivided form passing through the first. This is frequently accomplished in a one stage apparatus known as a spray tower wherein, for example, the tower is filled with the lighter or less dense liquid and a heavier or more dense liquid is sprayed into the top of the tower and passes downwardly through the light liquid in the form of droplets, collecting at the bottom as a separate phase and being withdrawn therefrom. The same effect can be accomplished by filling the tower with the heavier liquid and spraying the lighter liquid into the bottom of the spray tower so that the latter rises therethrough. By controlled withdrawal of light liquid from the upper portion of the tower and heavy liquid from the lower portion, a substantially countercurrent contact can be obtained.

It has been found that the efficiency of such a contact can be improved by employing a multi-stage contact of the two liquids wherein there are numerous dispersions of one liquid in another and reaccumulations of the dispersed liquid. These stagewise contacts produce better results since a truer countercurrent contact can be effected inasmuch as there is less internal circulation of the continuous phase and each equilibrium stage is separate so that the operation of the process may be better predicted.

Stagewise operations have been used employing bubble caps disposed on decks with overflow wiers or downcomers for the continuous phase as well as employing sieve decks, etc. In this type of apparatus, however, the rate of flow of one fluid through the other is dependent on the difference in specific gravity of the two fluids and therefore, the buoyancy of one in the other may seriously limit the rate at which such a column may operate. In sieve deck columns and bubble cap columns the pressure drop required to disperse one phase into the other a multiple number of times may also be so great as to limit the process or to make it too costly due to high power requirements.

Another group of liquid-liquid contactors employs a mechanical mixing element, frequently a rotating shaft upon which are disposed impellers, paddles, discs, etc., for the purpose of imparting turbulence to the countercurrently flowing streams within the tower. The present invention deals with an improvement in such a mechanically agitated liquid-liquid contacting apparatus which improvement provides a contactor wherein stagewise countercurrent liquid-liquid contact is obtained with extremely intimate contact of the phases. It is also an object of this invention to provide a liquid-liquid contact wherein both phases are dispersed so that each acts as a dispersed phase and as a continuous phase.

It is an embodiment of this invention to provide a contacting apparatus comprising in combination a vertical shell containing a series of horizontal ring-shaped plates attached thereto at vertical intervals along the height thereof, a rotatable shaft connected to driving means, said shaft extending through said ring-shaped plates and through said shell parallel to the axis of said shell, perforated discs attached askew to said shaft with said perforated discs positioned in the openings of said ring-shaped plates.

In another embodiment this invention relates to a contacting apparatus comprising in combination a cylindrical vertical shell having upper inlet and outlet openings and lower inlet and outlet openings, said shell containing a series of horizontal ring-shaped plates attached thereto at regular vertical intervals along its height, a rotatable shaft connected to driving means, the said shaft extended through said ring-shaped plates and through said shell coaxial thereto, circular perforated discs attached askew to said shaft, one of said perforated discs positioned in each of the openings of said ring-shaped plates.

It is still another embodiment of this invention to provide a process for contacting two substantially immiscible liquids of different specific gravity which comprises introducing the less dense of said liquids into at least the lowermost chamber of a multiple chamber contacting vessel and introducing the more dense of said liquids into at least the uppermost chamber of said vessel, passing the less dense liquid upwardly through said chamber in countercurrent contact with a descending more dense liquid through a plurality of contacting zones, each comprised of upper and lower perforated discs placed angular to perpendicular on a common rotating shaft and positioned in the center of a ring-shaped plate attached to said wall, accumulating a separate phase of more dense liquid above each rotating disc and a separate phase of less dense liquid below each of said rotating discs.

The process of this invention can best be described with reference to the accompanying drawing which illustrates one specific embodiment thereof and is intended to be illustrative rather than limiting upon the broad scope of this invention.

Figure I of the drawing illustrates one stage of a multiple stage contacting vessel in sectional isometric view while Figure II of the drawing illustrates a sectional elevation view of an entire contacting vessel containing six contacting stages.

Referring to Figure I the single contacting stage herein shown is contained within shell 21 and is formed by ring-shaped plates 22 and 23 vertically disposed and fixedly attached to shell 21. Coaxial with the cylindrical shell 21 is shaft 24 upon which perforated discs 25 and 26 are fixed. These discs are fixed angular to perpendicular upon the shaft so that when they rotate they will cause a vertical churning motion as well as a circular motion. Discs 25 and 26 are placed upon the shaft so that their angularities are opposing thereby neutralizing any vibration or bending effect upon the shaft. Discs 25 and 26 contain perforations 27 the function of which will be hereinafter described. As optional equipment, baffles 28 and 29 are attached to the inside of shell 21 and are elongated vertically within the contacting zone to cause straight line quiescent flow therethrough, thereby imparting a settling effect within each zone to aid in the reaccumulation in the dispersed phases within each stage. These baffles may be eliminated altogether or otherwise varied in shape, size or disposition depending upon the particular characteristics of the liquids.

In operation the heavy phase descending through shell 21 will accumulate above plate 26 and above plate 25 as a layer of heavy material and a light phase will accumulate below plates 25 and 26 as a layer of light material. When the shaft is rotating the periphery of each circular angular disc will be rapidly and violently plunged alternately into the heavy phase and the light phase so that it will cause a dispersion of heavy material in the light liquid and simultaneously cause a dispersion of the light material in the heavy liquid by forcing liquid through the perforations in each plate. Furthermore, the rotational motion of discs 25 and 26 will cause a thin elongated film of both phases at their periphery to be centrifugally sheared off, and will have the effect of causing large surface contact. Besides the rotational shear in the horizontal plane, the rapidly rising and falling motion of each periphery will cause shear in a vertical or cylindrical plane which will cause further contact between the phases. In addition to both of these effects the close proximity of the ring-shaped plate 22 will cause even another shearing effect and additional turbulence and the disc perforations will cause each phase to be broken into small droplets dispersed in the other phase. The heavy phase material descending from plate 26 and the light phase material rising from plate 25 have components both of vertical and rotational motion and when they enter the middle section of the contacting stage between baffles 28 and 29, the rotational motion is substantially eliminated and the effect of the turbulence from the rotating discs is greatly reduced so that phase separations may occur in this relatively quiescent zone.

Figure II illustrates at least schematically a complete contacting vessel employing a multiple number of stages such as those described with reference to Figure I. In Figure II cylindrical vertical shell 41 contains a series of ring-like plates 42 attached to the wall thereof. These ring-like plates 42 have a shaft 44 passing through the center thereof coaxial with shell 41 and upon this shaft a series of perforated discs are attached askew to the axis of the shaft. Discs 45 are fixed to the shaft so that each is positioned in the opening of a ring-shaped plate 42. Driving means 54, represented here as an electric motor, is attached in any suitable manner to impart rotational motion to shaft 45.

In operation the denser liquid is introduced into shell 41 through conduit 52 and accumulates above the uppermost of the ring-shaped plates. The rotational motion of the plates as hereinbefore described, causes a dispersion of this heavier material in the layer of less dense liquid immediately below the uppermost plate. As the heavier material descends through the column it is accumulated into a layer above each plate and redispersed into each lower contacting stage until finally it accumulates as a separate phase in the bottom of shell 41 and is withdrawn from the column through conduit 53. Similarly the less dense material is introduced into the lower portion of shell 41 through conduit 50 and it accumulates as a layer beneath the lowermost of the ring-shaped plates 42. The less dense material is also dispersed and reaccumulated in each of the contacting stages as it rises through the column and is eventually collected above the uppermost tray 42 and withdrawn from the column through conduit 51. Suitable controlling means may be employed to maintain the proper flow rate or level of material in the upper and lowermost of the contacting stages, however, since it is contemplated that conventional means will be used, they will not be described herein.

From the foregoing it may be seen that the present invention provides for a stagewise countercurrent liquid-liquid contact of two substantially immiscible liquids of different specific gravity wherein both phases are dispersed and subjected to shearing both in a horizontal and vertical plane. This apparatus furthermore imparts turbulence to the streams within each stage but allows for a quiescent reaccumulation of each phase before passing from stage to stage with the hereinbefore discussed beneficial results.

We claim as our invention:

1. A contacting apparatus comprising in combination a vertical shell containing a series of horizontal annular ring-shaped plates attached thereto at vertical intervals along its height and having openings therethrough, vertical baffles attached to the wall of the shell between said plates, a rotatable shaft extending through the openings of said ring-shaped plates and through said shell parallel to the axis of said shell, and perforated discs attached at oblique angles to said shaft, each of said perforated discs being positioned in the opening of one of said ring-shaped plates with part of its periphery above and another part of its periphery below the plate and adjacent discs being mounted at opposing angles on said shaft.

2. A contacting apparatus comprising in combination a cylindrical vertical shell having upper inlet and outlet openings and lower inlet and outlet openings, said shell containing a series of horizontal annular ring-shaped plates attached thereto at regular vertical intervals along its height and having openings therethrough, vertical baffles attached to the wall of the shell between said plates, a rotatable shaft extending through the openings of said ring-shaped plates and through said shell coaxial thereto, and circular perforated discs attached at oblique angles to said shaft, one of said perforated discs being positioned in each of the openings of said ring-shaped plates with part of its periphery above and another part of its periphery below the plate and adjacent discs being mounted at opposing angles on said shaft.

References Cited in the file of this patent

UNITED STATES PATENTS

| | | |
|---|---|---|
| 1,793,465 | Coahran | Feb. 24, 1931 |
| 1,856,120 | Valentine | May 3, 1932 |
| 2,029,691 | Robinson | Feb. 4, 1936 |
| 2,273,660 | Poole | Feb. 17, 1942 |
| 2,610,836 | Clarke | Sept. 16, 1952 |
| 2,667,407 | Fenske et al. | Jan. 26, 1954 |
| 2,740,696 | Longwell | Apr. 3, 1956 |